July 5, 1960 J. M. BUDZYNA 2,943,647
LOOM PICKER
Filed Sept. 22, 1958
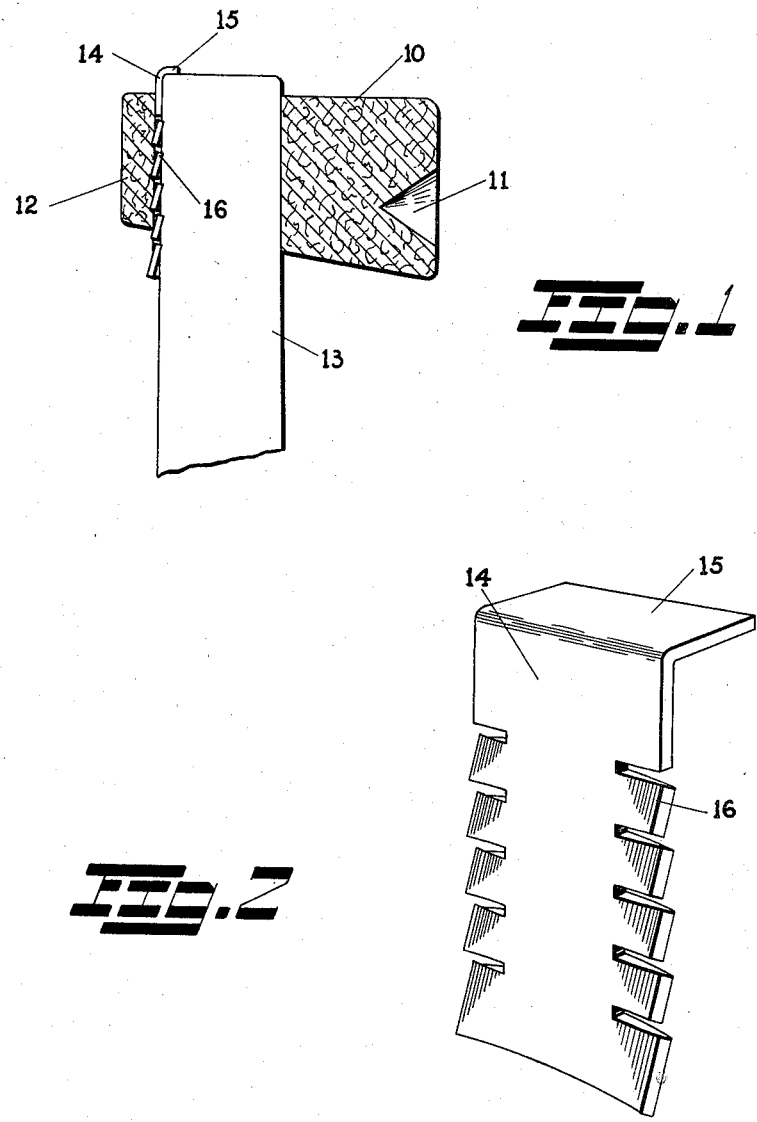
INVENTOR.
JOSEPH M. BUDZYNA
BY
ATTORNEY

United States Patent Office 2,943,647
Patented July 5, 1960

2,943,647
LOOM PICKER

Joseph M. Budzyna, East Douglas, Mass., assignor to Draper Corporation, Hopedale, Mass., a corporation of Maine Filed Sept. 22, 1958, Ser. No. 762,430

3 Claims. (Cl. 139—159)

This invention pertains to loom pickers and more specifically to a novel means for holding the picker in place on the picker stick.

It is a general object of the invention to devise a simple, effective and inexpensive means for holding a picker in place on the picker stick of a loom.

A further object is that of providing such a retaining means which makes possible very rapid assembly of the parts and which does not damage the stick to an extent such that when a worn picker is discarded, there will be any difficulty in applying and retaining another.

A further object is that of providing for assembling the picker and retaining member with ease and at the same time providing for positioning the picker in a proper position relative to the shuttle spur with which it is to function.

Other objects will become apparent from the following detailed disclosure.

Looms of the class which employ a picker fixed adjacent the end of a picker stick have usually employed a screw passing through a part of the picker and into the stick (usually made of wood). These pickers termed "loop pickers" have a part with a conically formed opening for engagement with the shuttle spur and a loop which engages about the stick end. The latter is slightly tapered and the loop of the picker driven on that taper to a position to align with the shuttle spur is locked in place by a screw. The end of the stick has to be drilled for the reception of the screw which in some cases splits the end of the stick. These screws frequently loosen and come out permitting the picker to shift or come off the stick entirely. After changing pickers a few times the screw usually will no longer hold in the stick and thus it becomes desirable to retain these parts in some better way. There have been many suggestions and clamps, wedges, special locking screws and the like have been subject matter of several patents, however, the loop picker is still almost universally held in place by a wood screw threaded into the stick.

According to the instant invention a very simple means is employed to lock a picker in place. This means comprises a strip-like member or tongue having serrations at the side next the stick for holding it from working off the stick but which offer very little resistance to assembly. These serrations may be in the form of what will be termed unidirectionally inclined teeth and in a preferred form of the invention such teeth are provided at both faces of the tongue. However, since, according to one mode of assembly, only the side next the stick has to slip on past the stick material, those at the opposite side need be only of some type to indent and prevent relative movement past the picker material.

A lip or stop is formed at the top of the tongue to prevent movement of that part onto the stick past a predetermined limit.

The invention will be described in greater detail by reference to one specific embodiment thereof as illustrated in the accompanying figures of drawing, wherein:

Fig. 1 is a section showing the structural details of the picker retaining means and mode of application.

Fig. 2 is a perspective view showing the locking tongue according to a preferred form thereof.

Now referring to Fig. 1, a picker of the type known as a "loop picker" has a body part 10 with a conical indentation 11 for reception of the spur of a shuttle and a loop 12 which fits about the upper, tapered end of a stick 13. The size of the opening provided by the loop is just sufficient to pass over the end of the stick with a locking tongue 14 in place. When thus assembled, the picker may be forced down onto the stick sliding over the tongue as it does so. The latter is prevented from moving farther down the stick by a stop or lip 15. It is to be understood that these picker loops are slightly extensible and the picker should be pushed onto the stick to a point where the socket 11 will align for proper contact with the shuttle spur.

As seen in Fig. 2, the tongue 14 has at each side a number of tooth-like members or serrations formed by slotting or cutting inwardly from the edges of a metallic or other strip and then twisting each rectangular projection 16 left by such cutting for about 10°-15°, more or less, and in such direction that when assembled, those projections, teeth or serrations at the stick face indent the stick and prevent movement toward the end of the stick but do not offer any substantial resistance to passing onto the stick. At the opposite side next the picker loop interior the serrations have the opposite effect, that is, they indent the loop material and prevent its moving up past the tongue, but likewise do not offer much resistance to the movement of the picker to position on the stick.

Normally, the tongue is put in position at the end of the stick with the lip 15 resting on the stick end and the picker is then forced onto the stick, however, as an alternate system, the tongue may be positioned in the loop before assembly, the projections, serrations or spurs with which the tongue is provided at the side next the loop need not incline in a direction to be considered as "unidirectional" a term applied to the serrations as they affect the stick material.

The lip 15 is formed by bending the top of the tongue strip over at about a 90° angle. While this latter part may not be entirely essential it does serve a definite purpose in facilitating assembly.

The specific tongue herein shown has the advantage that its teeth are easily struck out in a die and their angular inclination serves to give the desired effect at each side. It is not necessary to form teeth at one side and then at the other. Any good grade of steel may be employed and as the parts are formed by appropriate dies, their cost may be reduced to a very small amount. The tongues can, of course, be used many times.

The picker may be forced off the stick but unless it is desired to save it for further use, the better system is to cut the picker loop in which event the picker stick material is not scraped by forcing the tongue in the wrong direction considering its teeth.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. In combination with a picker stick of a loom and a loop picker operatively mounted adjacent an end of said stick, a picker locking tongue comprising an elongate, generally flat, strip-like member wedged between an inner face of the picker loop and the stick, said member having a plurality of tooth-like projections at each face, those projections being directed to permit them to slide over adjacent material when the parts are assembled but to indent that material and to resist movement in the direction of withdrawal.

2. In combination with a picker stick of a loom and a loop picker operatively mounted adjacent an end of said stick, a picker locking tongue comprising an elongate, generally flat, strip-like member wedged between an inner face of the picker loop and the stick, said member having a plurality of tooth-like projections at the side next the stick so formed and inclined as to be movable along the stick when assembling the parts but to prevent removal of the tongue when once assembled, and a plurality of spur-like projections at its opposite side for indentation into the material of the picker.

3. In combination with a picker stick of a loom and a loop picker operatively mounted adjacent an end of said stick, a picker locking tongue comprising an elongate, generally flat, strip-like member wedged between an inner face of the loop picker and stick, said member having a series of unidirectionally inclined serrations formed as rectangular projections extending laterally of the tongue and twisted to incline for indenting both the picker and the stick to prevent removal of the picker from the stick.

References Cited in the file of this patent

UNITED STATES PATENTS

| | | |
|---|---|---|
| 1,575,598 | Gagnon | Mar. 2, 1926 |
| 2,522,862 | Crocker | Sept. 19, 1950 |
| 2,524,443 | Huffman | Oct. 3, 1950 |